US008204032B2

(12) United States Patent
Gao et al.

(10) Patent No.: US 8,204,032 B2
(45) Date of Patent: Jun. 19, 2012

(54) INFORMATION POLLING METHOD, APPARATUS AND SYSTEM

(75) Inventors: Zhi Guo Gao, Beijing (CN); Yun Zhang Pei, Beijing (CN); Chen Wang, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/201,001

(22) Filed: Aug. 29, 2008

(65) Prior Publication Data

US 2009/0059950 A1 Mar. 5, 2009

(30) Foreign Application Priority Data

Aug. 31, 2007 (CN) .......................... 2007 1 0148380

(51) Int. Cl.
*H04J 3/16* (2006.01)
(52) U.S. Cl. ......... 370/346; 370/310; 370/440; 370/447
(58) Field of Classification Search .................. 370/440, 370/346, 449, 310, 447
See application file for complete search history.

(56) References Cited

U.S. PATENT DOCUMENTS

| | | | | |
|---|---|---|---|---|
| 6,119,167 A * | 9/2000 | Boyle et al. | ................... | 709/203 |
| 6,215,764 B1 * | 4/2001 | Wey et al. | ...................... | 370/216 |
| 6,640,268 B1 * | 10/2003 | Kumar | ............................ | 710/46 |
| 6,744,780 B1 * | 6/2004 | Gu et al. | ........................ | 370/450 |
| 6,791,998 B1 * | 9/2004 | Yoshihara et al. | ............. | 370/449 |
| 6,931,460 B2 | 8/2005 | Barrett | | |
| 6,996,119 B2 * | 2/2006 | Koo | ............... | 370/449 |
| 7,093,141 B2 * | 8/2006 | Elnozahy et al. | .............. | 713/300 |
| 7,283,555 B2 * | 10/2007 | Duncan et al. | ................. | 370/449 |
| 7,548,969 B2 * | 6/2009 | Tripp et al. | ..................... | 709/223 |
| 2005/0135409 A1 * | 6/2005 | Janczak | ......................... | 370/449 |
| 2006/0146863 A1 | 7/2006 | Spinar et al. | | |
| 2007/0027987 A1 * | 2/2007 | Tripp et al. | ..................... | 709/225 |
| 2008/0091773 A1 * | 4/2008 | Hameen-Anttila | ............ | 709/203 |

OTHER PUBLICATIONS

Hu et al.; ( "Dynamic Data Broadcasting with Traffic Awareness");2002; National Taiwan University; pp. 1-8.*
Shin, et al., "Real-time network monitoring scheme based on SNMP for dynamic information", Journal of Network and Computer Applications, Jan. 2007, pp. 331-353, vol. 30, n. 1.
Sundaresan, et al., "Adaptive Polling of Grid Resource Monitors Using a Slacker Coherence Model", Proceedings of the 12th IEEE International Symposium on High Performance Distributed Computing, HPDC '03, 1082-8907/03, 2003 IEEE.

* cited by examiner

*Primary Examiner* — Ricky Ngo
*Assistant Examiner* — Dewanda Samuel
(74) *Attorney, Agent, or Firm* — Jon A. Gibbons; Fleit Gibbons Gutman Bongini & Bianco PL

(57) ABSTRACT

The invention provides an information polling method, apparatus and system thereof, wherein a message gateway receives an information polling request from an application in an application client, and according to the received information polling request, the message gateway acquires at least one message requested by the application and calculates a reference polling cycle of the application, and sends the acquired message requested by the application and the reference polling cycle to the application. The application determines a polling cycle of a next poll according to a load condition of the application client and the received reference polling cycle. According to the invention, efficiency and quality of the information polling is improved, while the system is ensured to run normally, reducing the cases of message blocking and system breakdown which may occur in the existing situations.

19 Claims, 7 Drawing Sheets

INFORMATION POLLING METHOD, APPARATUS AND SYSTEM

CROSS-REFERENCE TO RELATED APPLICATIONS

This application is based upon and claims priority from prior Chinese Patent Application No. 200710148380.3, filed on Aug. 31, 2007 the disclosure of which is herein incorporated by reference in its entirety.

FIELD OF THE INVENTION

The present invention generally relates to an information poll method and device, and particularly to an information poll method, apparatus and system thereof for adaptively and dynamically adjusting the polling cycle.

BACKGROUND OF THE INVENTION

Nowadays, a message gateway has been commonly used as a kind of intermediate device for a telecommunication value-added service to send and receive a message to and from a mobile communication network. A typical example is a short message gateway, multimedia message center and Parlay X gateway for processing the short message or multimedia message. As shown in FIG. 1, an end user may send a short message or a multimedia message to the telecommunication value-added application 13 via his handhold terminal 10 to request a related service. For example, the end user may request for downloading a mobile ring tone. The message sent by the end user will be intercepted by the message gateway 12 and then sent to an address that is specified by the message so that the telecommunication value-added application 13 can obtain the message sent by the end user.

Currently, there are two ways for the telecommunication value-added application to obtain a message from the gateway: a push mode 15 and a poll mode 16. In the push mode 15, once the message gateway 12 obtains a message from the communication network 11, the message gateway sends the message to a corresponding application 13 immediately. While in the poll mode 16, the application 13 requests the arrived message from the message gateway 12 periodically.

Generally, if the number of messages is large, the poll mode is more efficient than the push mode, since the application may obtain a set of messages by one message requesting action. Contrarily, as for the push mode, the message gateway can push only one message to the application once, bringing a great interaction load.

For those simple applications which obtain only messages from the network, such as an application for the mobile user's short message television quiz, advantage of the poll mode will be more obvious. With respect to the message gateway, the application is located in an application client 14. When the application needs the related message, it requests for the related message from the message gateway actively. However, for the push mode, the application may only passively receive messages sent from the message gateway, so the application has to maintain on-line state, which results in heavier and more complex workload of receiving message.

In the poll mode, it is an important issue how to determine an appropriate polling cycle. This is because a too-short polling cycle needlessly increases the workload of the message gateway, while a too-long polling cycle would render too many messages waiting to be processed. Thus, it becomes very important how to improve efficiency and service quality of the message gateway by determining a better polling cycle.

One solution is for an administrator to manually set the polling cycle according to his/her experience regardless of currently running condition of the message gateway. However, when there are not so many corresponding messages for the application, this usual method of simply, periodically polling the message gateway will lead to unnecessary load for the message gateway.

Similarly, for many other information apparatus in addition to the message gateway, the same efficiency problem occurs in the information polling. The above is to explain problems in the prior art by example of the message gateway, only because the problem of the polling cycle of the message in the message gateway is the most exigent. The method, apparatus and system provided by the invention are not limited to the message gateway and its related method.

According what is needed is a method and system to over come the problems encountered in the prior art and to provide an improved polling cycle for message delivery.

SUMMARY OF THE INVENTION

With respect to the above problems, efficiency of the information polling needs to be improved.

To solve the existing problems in the prior art, according to an aspect of the invention, an information poll method is provided, the method comprising: receiving an information poll request from an application in an application client; acquiring a message requested by the application, and calculating a reference polling cycle of the application; and sending the acquired message requested by the application and the reference polling cycle to the application.

According to another aspect of the invention, a device for information poll is provided, the device comprising: a transceiver receiving an information polling request from an application in an application client; and a scheduler calculating a reference poll cycle of the application, the reference poll cycle is sent to the application by the transceiver.

According to another aspect of the invention, an information polling system is provided, the system comprising a message gateway, wherein the message gateway receives an information polling request sent by an application running in an application client, and in responsive to the received information poll request, the message gateway acquires a message requested by the application and calculates a reference polling cycle of the application, and sends the acquired message requested by the application and the reference poll cycle to the application in the application client.

Through the above technical solutions of the invention, the actual polling cycle may be adjusted dynamically. When the arrival rate of messages is relatively slow, the polling cycle will be extended according to the reduced server load, and when the arrival rate of messages is relatively high, the poll cycle is shortened to provide a better response capability.

On the other hand, when a message gateway is overload, the polling cycle may be dynamically extended so as to protect the message gateway and avoid the overload. Also, by providing a relatively short polling cycle for a more important application, a telecommunication provider can provide different levels of services for different applications.

Other features and advantages of the invention will become more apparent after reading the detailed description of the embodiments of the invention in connection with the attached figures.

BRIEF DESCRIPTION OF THE DRAWINGS

The following figures will be referred to describe features and advantages of the embodiments of the invention in detail. If possible, the same or like reference numerals will be used to indicate the same or like parts in the description and figures in which.

DESCRIPTION OF THE PREFERRED EMBODIMENTS

Below, the embodiments of the invention will be described in detail in conjunction with the appended figures. The figures form a part of the specification and illustrate some embodiments of the invention. It is understood that other embodiments may be used and changes in structures and operations may be made without departing from the scope of the invention. Further, the above embodiments are used to describe how the invention is implemented only, and should not be considered as limitation to the protection scope of the invention. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
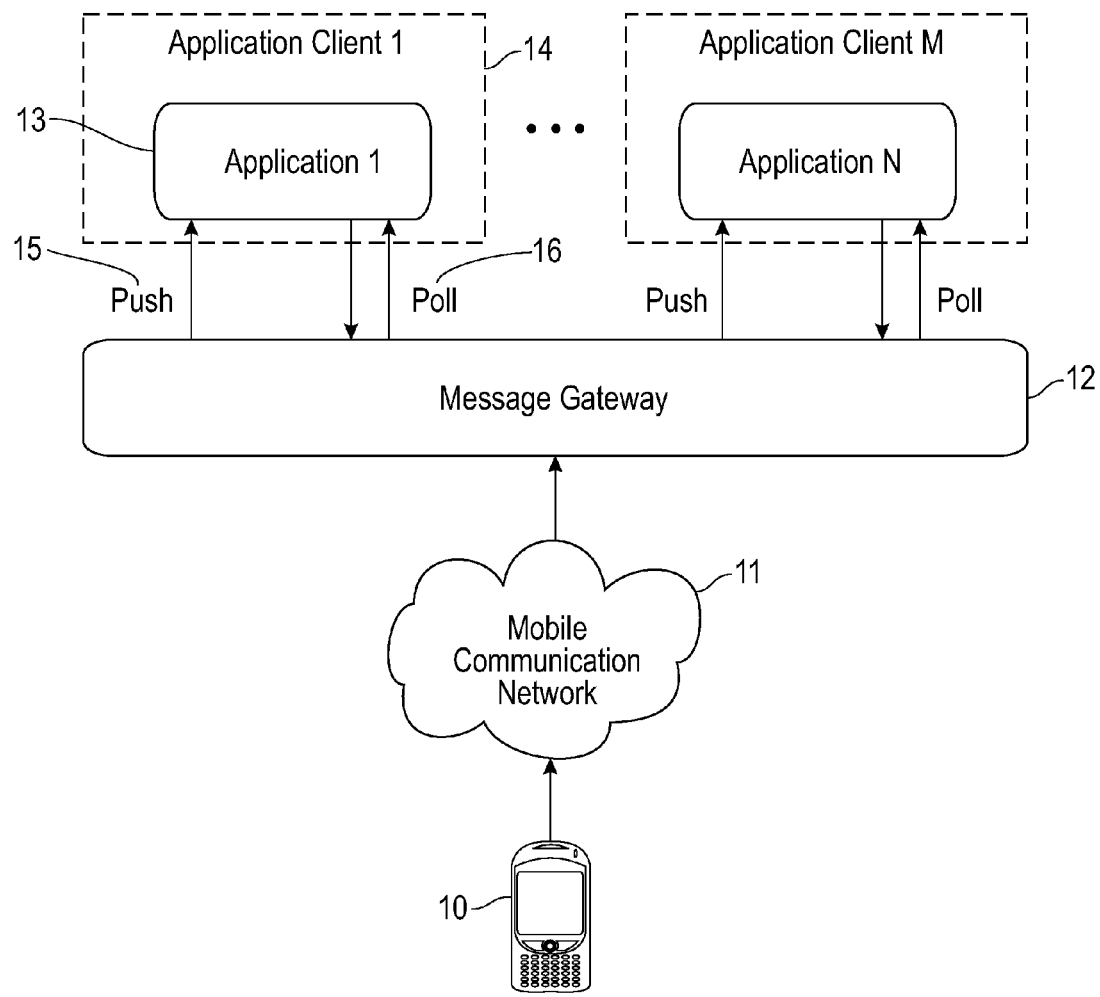
FIG. 1 is a system diagram illustrating a push mode and a poll mode for acquiring messages in the prior art.
Figure 2:
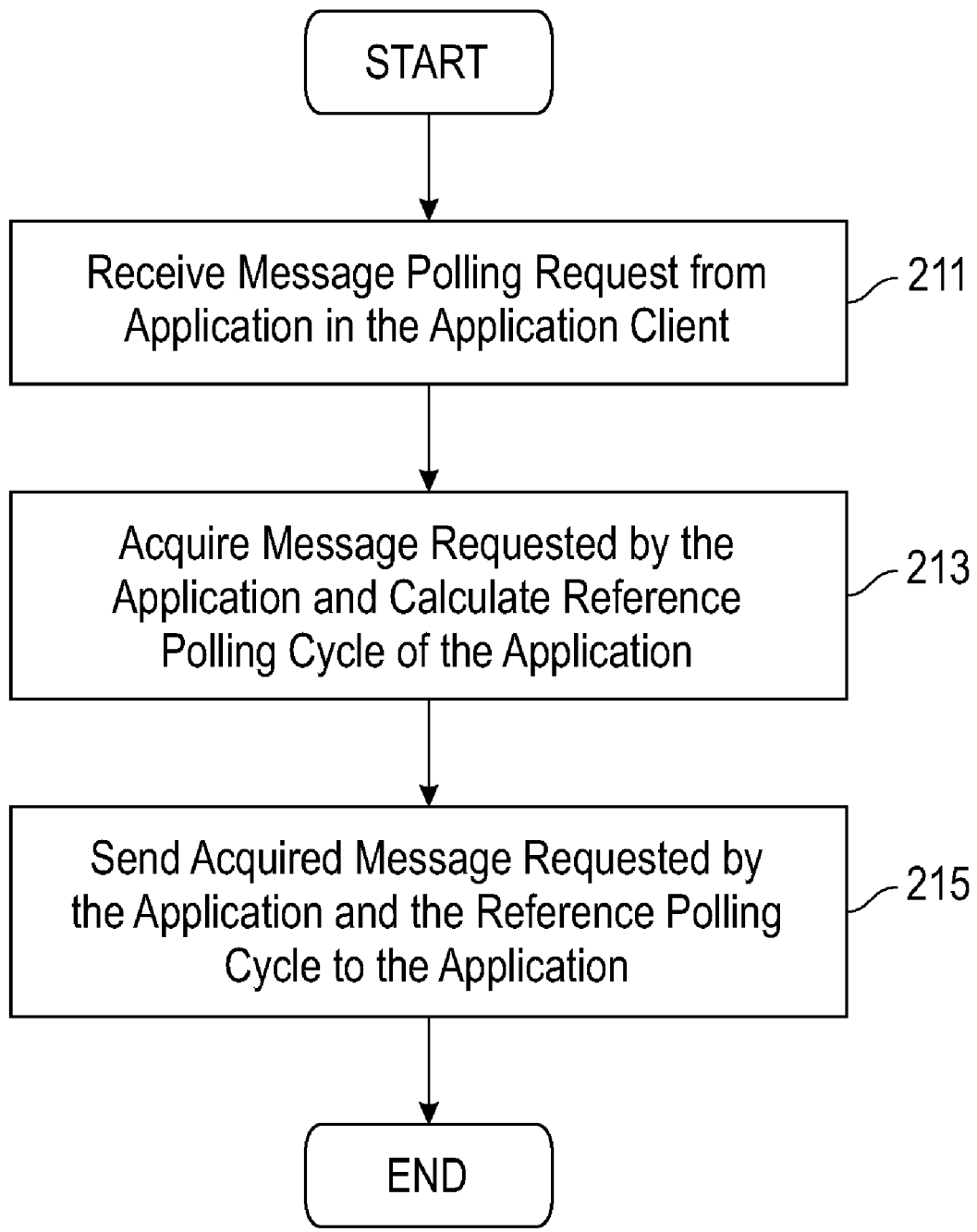
FIG. 2 is a flow diagram illustrating an information polling method of a first embodiment of the invention.
Figure 3:
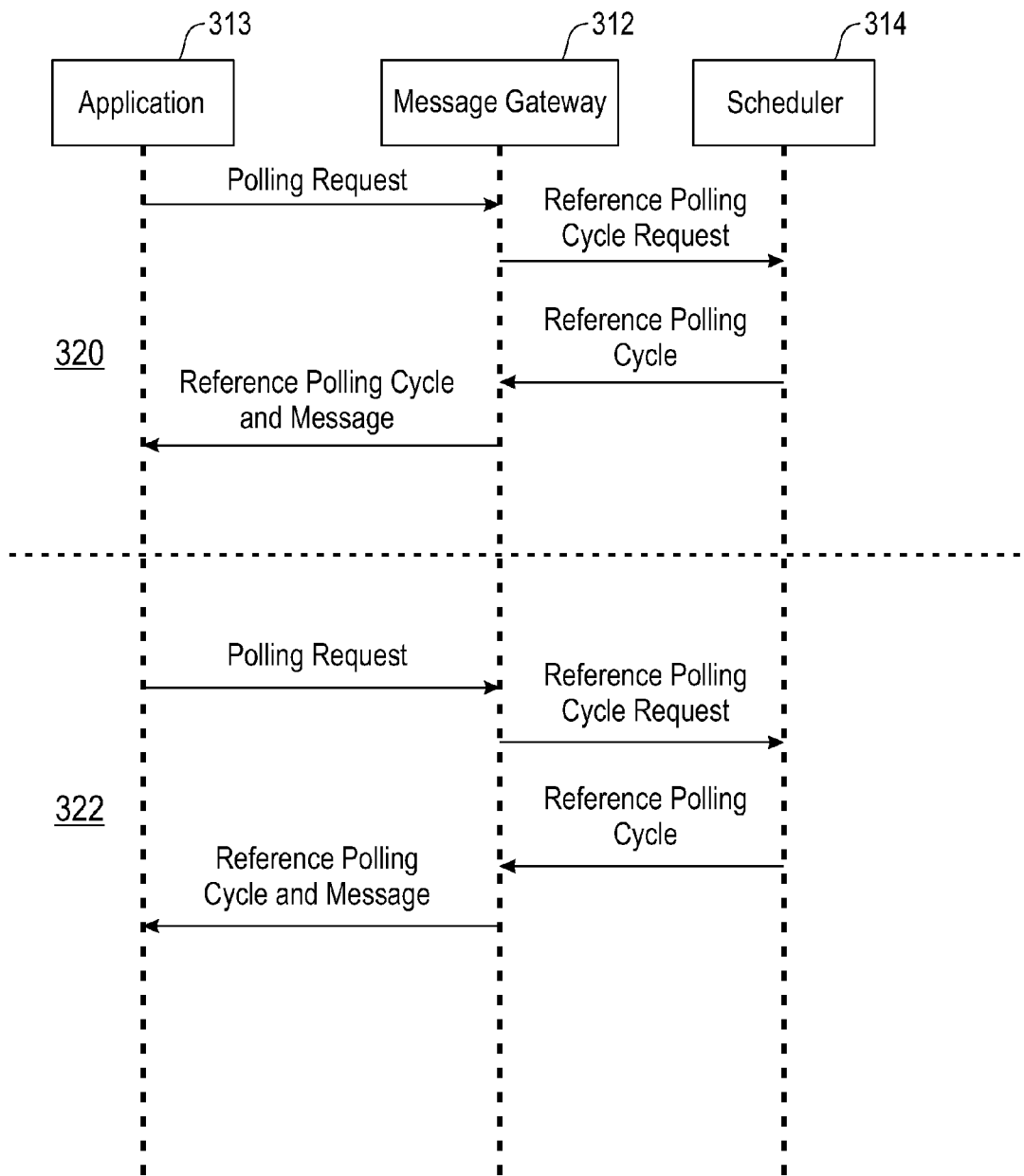
FIG. 3 is a timing diagram illustrating an information interaction process of the first embodiment of the invention.

FIG. 2 is a flow diagram illustrating a message polling method according to an embodiment of the invention, and FIG. 3 shows an information interaction process of the above embodiment of the invention. The first embodiment of the invention will be described in detail with reference to FIG. 2 and FIG. 3.

First, at the step 211, an application 313 located in an application client 14 takes a poll mode to send a polling request to a message gateway 312, which receives the polling request sent by the application 313. The message gateway 312 will obtain the messages that are required by the poll request of the application 313. On the other hand, the message gateway 312 will also send a request for calculating a reference polling cycle to a scheduler 314 in the message gateway. The scheduler 314 calculates a reference polling cycle—a method of the calculation will be described in detail in the specification later. The scheduler 314 returns the calculated reference polling cycle to the message gateway 312, which finally sends the obtained message required by the polling request and the calculated reference polling cycle to the application 313. Thus, a poll 320 is completed. Like the last poll 320, in a next poll 322, the application 313 will obtain a re-calculated reference polling cycle. Preferably, the application 313 may determine an alternative cycle of the next message poll 322 according to the reference polling cycle and the load condition of the application client where it is located. Namely, the reference polling cycle obtained by the application 313 is only for reference, and when the application client where the application 313 is located is in overload, the application 313 may reset its polling cycle. Further preferably, the application may send a polling request for a specific message immediately according to a related emergent request regardless of the received reference poll cycle.

Figure 4:
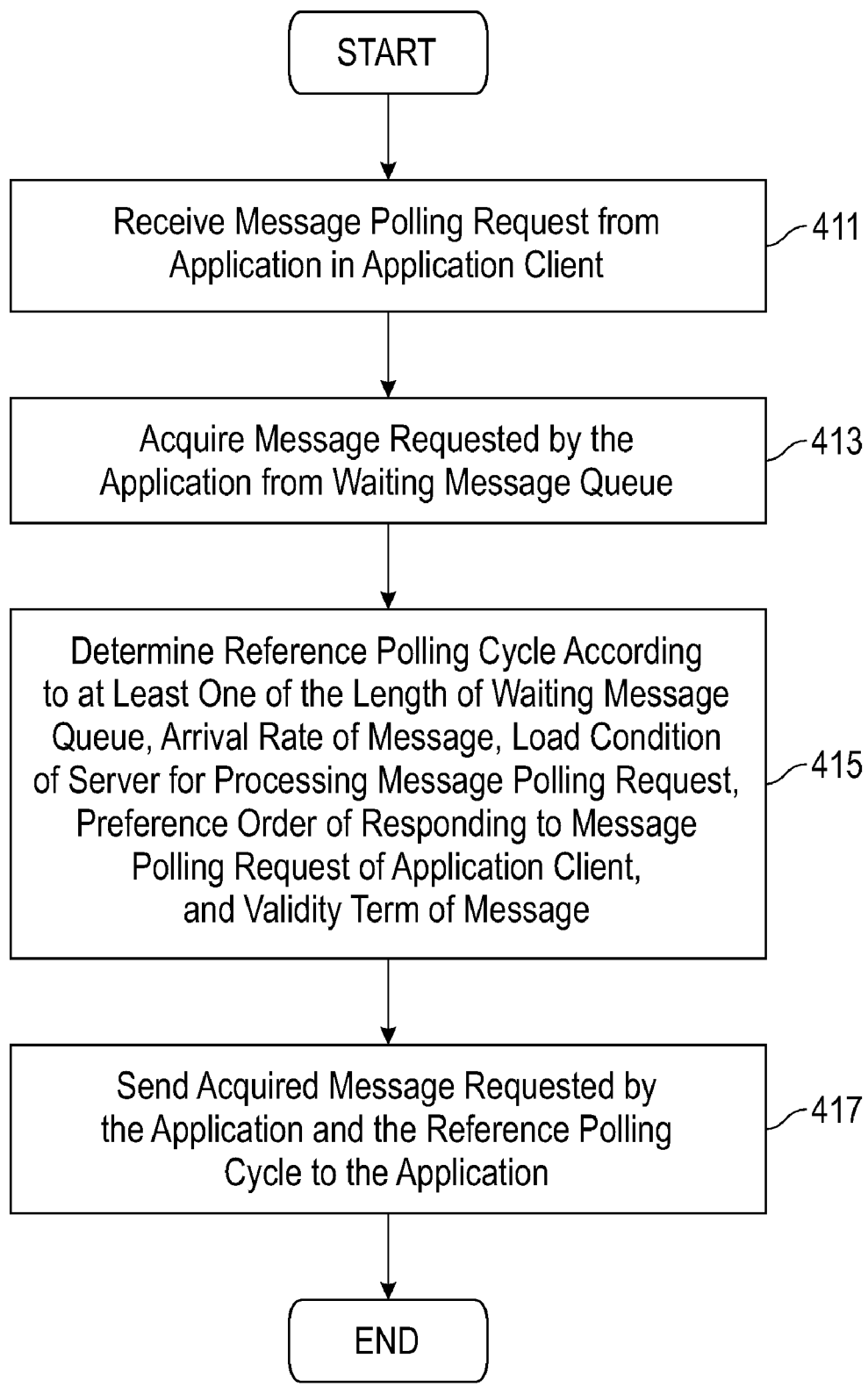
FIG. 4 is a flow diagram illustrating an information poll method of a second embodiment of the invention.
Figure 5:
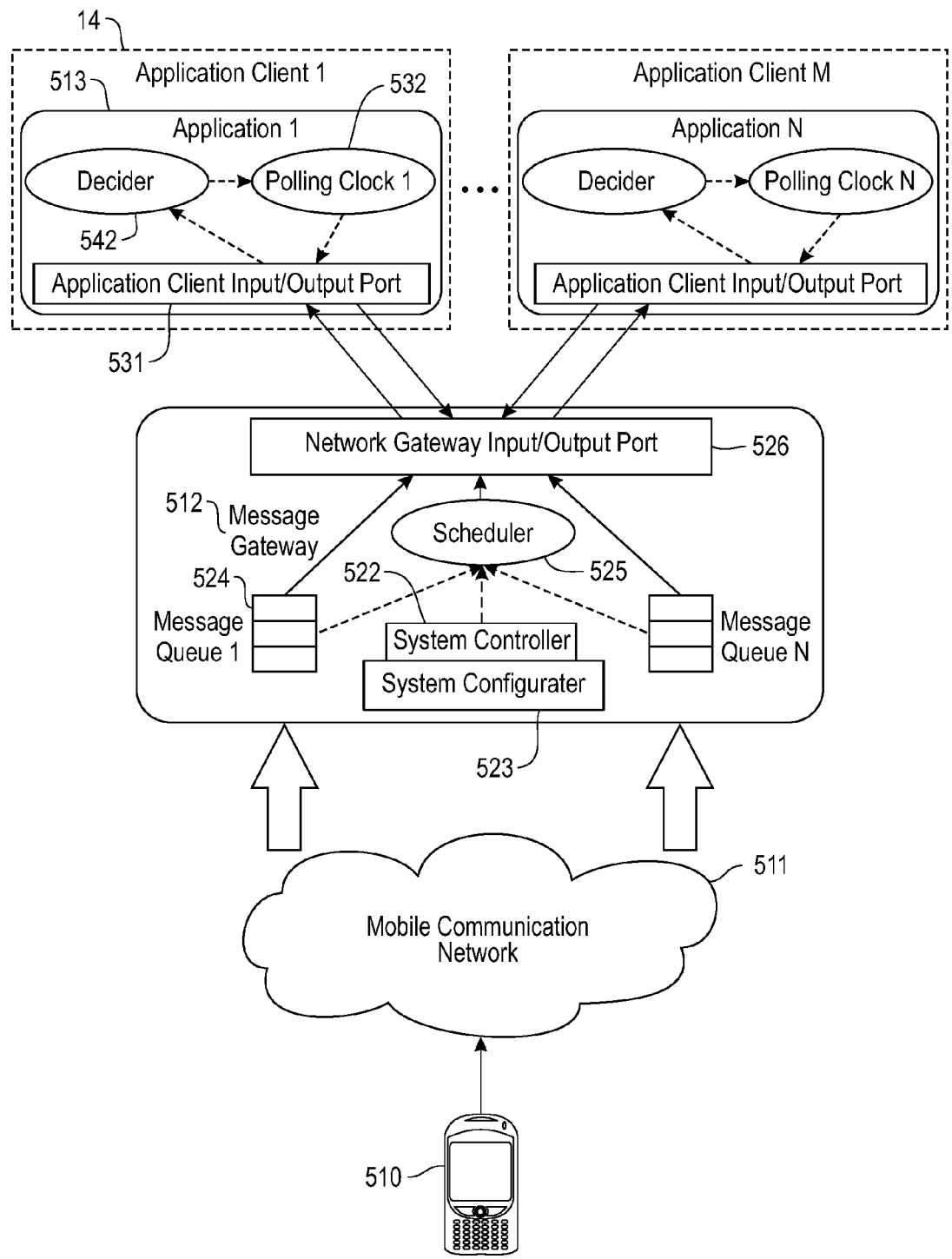
FIG. 5 is a system diagram illustrating another embodiment of the invention.

FIG. 4 is a flow diagram illustrating a message poll method according to another more preferable second embodiment of the invention, and FIG. 5 shows a block diagram of the related devices and system of the invention for implementing the more preferable embodiment above. Hereinafter, the second embodiment of the invention will be described in detail with respect to FIG. 4 and FIG. 5.

As well known, each application client 14 may include one or more applications 513. Through a handhold communication apparatus 510 and a mobile communication network 511, a user may send a related message or a service request to a message gateway 512. The message or service request is stored in a message queue 524 of the message gateway. Of course, it can be stored in a database or other appropriate storage methods may be used. At the step 410, the application 513 at the application client 14 actively sends a polling request to the message gateway 512 through an application client input/output port 531 of the application client 14 in the poll mode. The message gateway 512 receives the polling request sent by the application 513 through a gateway input/output port 526 and processes the polling request. The message gateway 512 will read messages required by the polling request of the application 513 from a specified message queue 524 according to the polling request while deleting these messages from the message queue. On the other hand, the message gateway 512 will also instruct a scheduler 525 to calculate a reference polling cycle. The scheduler 525 will obtain the length of the waiting message queue, the message arrival rate, and the message validity term from the message queue 524, in which the length of the message queue may be obtained by summing the number of the messages in the queue, the arrival rate of the message may be obtained by a calculation when each message arrives in real-time, and the message validity term is determined from Quality of Service (QoS) required by a specific application. Further, the scheduler 525 also obtains CPU load condition of the message gateway 512 from a system controller 522. The CPU load condition may be acquired by the existing application tools, such as the system monitor in a Windows operation system, the vmstat in a Linux operation system, and so on, and obtains a preference order of responding to the message polling request of the application client from a system configurater 523. The preference order may be pre-set through the system configurater 523. Then, the scheduler 525 determines the reference poll cycle according to at least one of the above factors, and the specific method of calculating the reference polling cycle will be described in detail later. Finally, the message gateway 512 sends the acquired message required by the polling request and the above reference polling cycle to the application 513 through the gateway input/output port 526, and the application 513 receives the message required by the poll request and the above reference polling cycle through the application client input/output port 531. The above reference polling cycle will be set by a decider 542 to a poll clock 532. Thus, this poll is completed, and the polling cycle for the next poll of the application 513 is determined. During the next information poll triggered based on the above reference polling cycle, the application 513 will undoubtedly obtain a re-calculated reference polling cycle. Further preferably, the application may send a polling request for a specific message immediately according to a related emergent request regardless of the received reference poll cycle.

The application 513 may use multiple types of standard protocols in the prior art to conduct information interactions with the message gateway 512. For example, it may use the SMPP (short message peer-to-peer protocol) standard protocol to perform a poll of short messages, or use the MM7 (Multimedia Messaging Services protocol) standard protocol to perform a poll of multimedia messages, or use the CMPP (China Mobile Peer to Peer) protocol, short message and multimedia message interface of Parlay X, and other protocols. The above standard protocols all have the reserved optional parameters for purpose of extension. For example, in the SMPP standard protocol, the reserved optional parameters are attached after a message header and compelling parameters. The optional parameters may be encoded as triplelet of <label, length, value>. The above reference polling cycle may be conveyed by the reserved optional parameters for extension. Existing applications may omit optional parameters that they can not identify, but the new applications supporting new extension parameters may use these characteristics accordingly. The above reference polling cycle may be sent to the applications by the message gateway through the reserved optional parameters.

Figure 6:
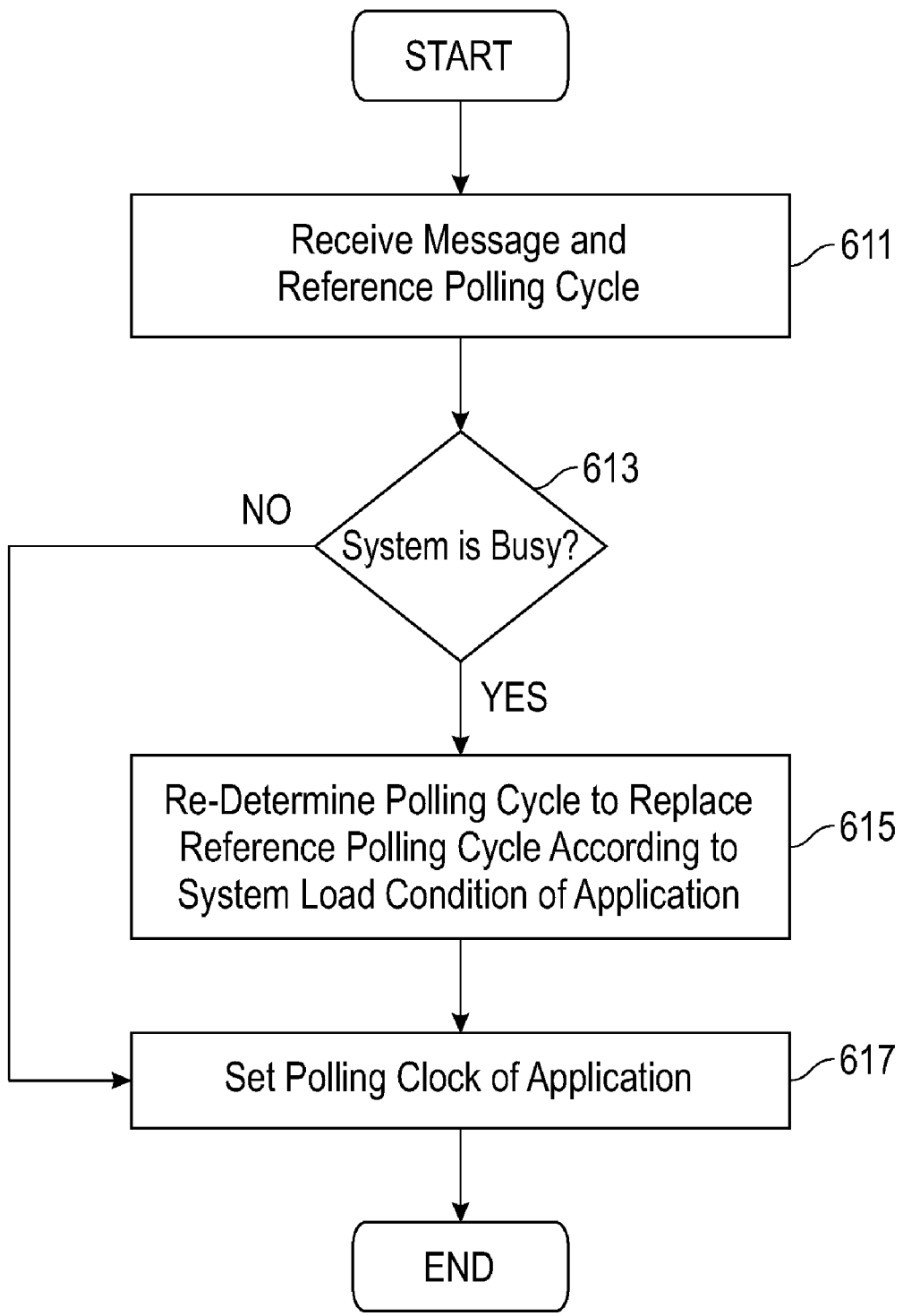
FIG. 6 is a flow diagram illustrating an information polling method of a third embodiment of the invention.

FIG. 6 shows a message polling method according to another preferable embodiment of the invention. In the method, the application 513 has obtained a requested message from the message gateway 512, and further obtained a reasonable reference polling cycle. On one hand, the application 513 may set its poll clock directly according to the obtained reference poll cycle, and when the poll time arrives, the application 513 will send a next polling request to the message gateway 512. Preferably, the application 513 may process the obtained reference polling cycle in many ways. In the step 611 as shown in FIG. 6, the application 513 receives the message and reference polling cycle. After receiving the reference polling cycle, at the step 613, the decider 542 of the application 513 will make a decision based on the load condition of the application client. If the system is busy, it is not appreciate to poll based on the reference polling cycle, and at the step 615, the decider 542 of the application 513 will re-calculate an appropriate polling cycle according to the condition of the application system so as to replace the reference polling cycle. A method of re-calculating the poll cycle according to the condition of the application system will be described in detail later. At the step 617, the decider 542 of the application 513 will set the poll clock 532 of the application 513 according to the reference poll cycle or the re-calculated poll cycle for replacing the reference poll cycle so as to determine time for the next poll. Further preferably, the application may immediately send a polling request for a specific message according to a related emergent request regardless of the received reference polling cycle and the re-calculated polling cycle for replacing the reference polling cycle.

Figure 7:
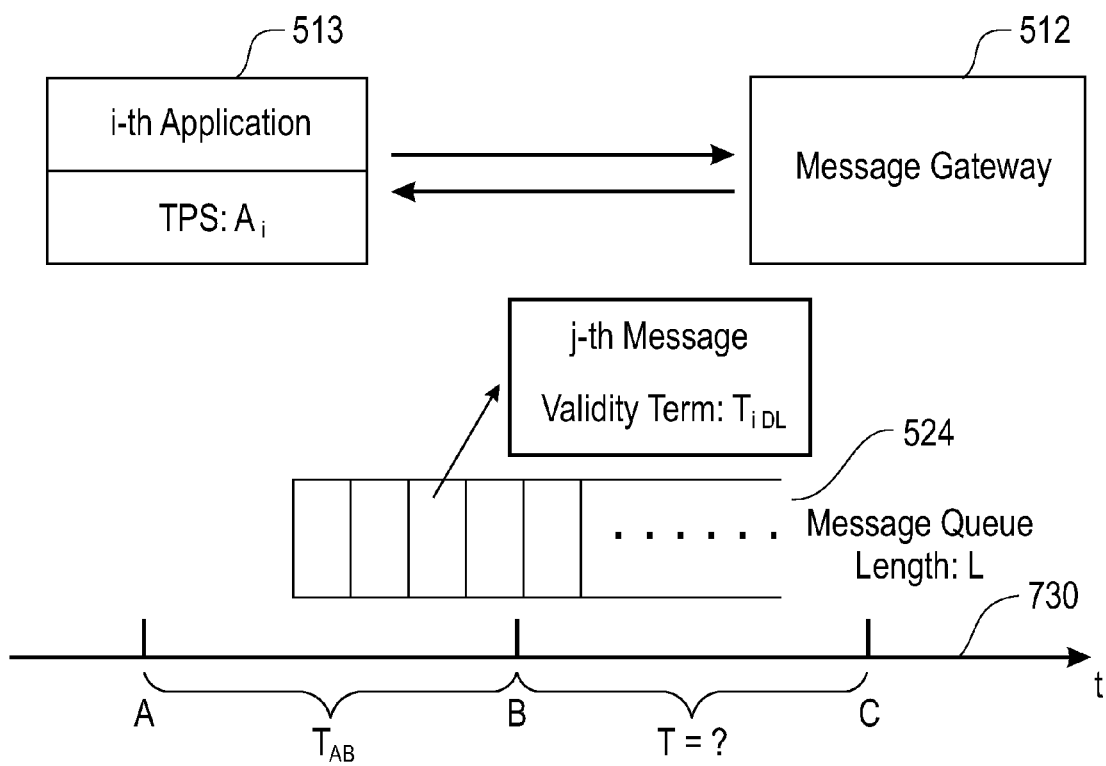
FIG. 7 is a diagram of a method of calculating a reference polling cycle.

In this section, a method of calculating the reference cycle by the scheduler 525 according to the related information will be described in detail. As described previously, the scheduler 525 will obtain the length information on waiting message queue, the information on the message arrival rate, and the message validity term from the message queue 524. With reference to FIG. 7, the message queue 524 has a queue length of L, and each message j in the queue contains a validity term Tj-DL of the message, that is, the message requires to be processed no later than the time point Tj-DL, which is a necessary parameter for achieving a certain quality of service (QoS). In time axis 730, the message arrival rate rAB in time period TAB may be calculated according to the following formula (1). It is generally believed that in the time intervals adjacent to each other, the message arrival rates retain stable substantially. Thus, in the following calculation, the message arrival rate rAB in the time period TAB may be regarded as a probable arrival rate rBC in the time period TBC. NAB indicates the amount of messages sent by the user and received by the message gateway in the time period TAB. Calculation of the reference cycle T is to determine a reasonable time interval (or cycle) T for the application to send the next poll.

$$r_{AB} = \frac{N_{AB}}{T_{AB}} \qquad (1)$$

Further, a parameter Ai is used to represent the processing capability of the application client where the application 513 is located, such as transaction per second (TPS) that can be processed under a normal CPU load condition. This parameter is obtained by pressure tests to the same load previously, and is preset into the message gateway in order for the scheduler 525 to calculate the reference poll cycle T. Three constraint conditions may be applied to the reference poll cycle T, but they are not necessary to be applied at the same time, and one of them may be applied, and other constraint may be applied as required:

(1) before the next poll, the application 513 will process the existing and newly-arrived messages in the message gateway within the reference polling cycle T;

(2) the existing and newly-arrived messages in the message gateway are less than a maximum value M of the message number that can be processed by the application 513;

(3) completing the process of each message before the validity term required for processing the message.

As shown in FIG. 7, the above constraints of the reference poll cycle T (time span from a time point B to a time point C) may be represented by formulas (2), (3) and (4).

$$\frac{r_{AB}T + L}{A_i} < T \qquad (2)$$

$$r_{AB}T + L < M \qquad (3)$$

$$T < \min(T_{j-DL} - T_B) = T_4 \qquad (4)$$

Where TB is time of the time point B, and physical meanings of other denotations have been described above in detail and will be omitted here. Equations (2) and (3) maybe re-written to yield formulas (5) and (6):

$$T > \frac{L}{A_i - r_{AB}} = T_1 \qquad (5)$$

$$T < \frac{M - L}{r_{AB}} = T_3 \qquad (6)$$

Let T2=min(T3,T4), and denotations T1, T2, T3, T4 are used to express corresponding formulas conveniently. Then the reference poll cycle may be calculated by formula (7):

$$T = T_1 + \alpha\beta(T_2 - T_1) \qquad (7)$$

Where α,β∈(0,1), and α indicates a preference level of the application 513. For higher level and application that more needs to be processed preferentially, the value of α will be lower. For example, α=0.1 may represent an application with the highest level, and α=1 may indicate an application with the lowest preference. Such difference may give different reference polling cycles to different applications, so as to obtain different qualities of service. β is a parameter used to indicate the CPU load of the message gateway 512. When CPU load is heavier, the value of β is greater, and is less on the contrary. For example, β=0.1 may indicate that CPU is in a condition of almost idle, and β=1 indicates CPU in a state of the heaviest load.

The reference poll cycle calculated by the formula (7) is one of the preferred embodiments taking into account factors of the length of the waiting message queue, the arrival rate of the message, the load condition of a server for processing the information polling request, the preference order of responding to the information polling request of the application client, the service term of the message synthetically. In fact, those skilled in the art may obtain various other embodiments from the invention including any reasonable combination of the above factors. For example, if only one or more of the above factors are taken into account, a reasonable reference poll cycle T may be obtained from formula (8), (9) or (10), respectively.

$$T = T_1 + \beta(T_2 - T_1) \quad (8)$$

$$T = T_1 + \alpha(T_2 - T_1) \quad (9)$$

$$T = kT_2 \quad (10)$$

where a weight coefficient $k \in (0,1)$.

Preferably, the decider 542 of the application 513 at the application client 14 may decide a poll cycle TC to be used finally according to busy/idle condition of CPU of the application client after obtaining the reference polling cycle T, and formula (11) shows a method of calculating TC.

$$T_C = (1 + (\beta_1 - \beta_0)) * T \quad (11)$$

Where β0 indicates a standard load condition of the CPU of the application client, for example it is 70%, and β1 represents an actual load condition of the CPU of the application client. When β1 is less than 70%, a poll may be performed ahead correspondingly. On the contrary, if the load of the applicant client is too heavy, the polling cycle should be extended to prevent the application client from breakdown due to the too heavy load. Actually, those skilled in the art may implement various other embodiments according to the invention. For example, the poll cycle TC that is used finally may be calculated by formulas (12), (13):

$$T_C = (1 + \delta(\beta_1 - \beta_0)) * T \quad (12)$$

$$\delta(\beta_1 - \beta_0) = \begin{cases} \beta_1 - \beta_0 & \text{if } (\beta_1 - \beta_0) > 0 \\ 0 & (\beta_1 - \beta_0) \leq 0 \end{cases} \quad (13)$$

An obvious advantage of the poll cycle TC calculated by formulas (12), (13) is that the load of the message gateway will not be over incremented finally due to too-frequent polling caused by the idle of the application client.

It can be known from the above respective embodiments that the actual polling cycle may be adjusted dynamically through the technical solutions of the invention. When the arrival rate of a message is relatively slow, the polling cycle will be extended according to the reduced server load of the message gateway, and when the arrival rate of the message is relatively high, the polling cycle is shortened to increase polling frequency and to provide a better response capability. On the other hand, when the load of the message gateway is over high, the polling frequency may be limited dynamically so as to protect the message gateway and avoid an overload. Also, by providing a relatively high polling frequency for a more important application, a telecommunication provider can provide different levels of services for different applications. Further, the load condition of the application client may be responded dynamically and the poll cycle may be adjusted dynamically to ensure the normal running of the application itself. Thus, the respective embodiments of the invention improve the efficiency and quality of the message poll greatly, while ensuring the normal running of the system and avoiding cases of message block and system breakdown that often occur in the existing environment.

As can be understood by those skilled in the art, all or any step or part of the method and device of the invention may be implemented in any computing apparatus (including processor, storage medium, and so on) or network of the computing apparatuses by hardware, firmware, software and combinations thereof which can be achieved by those skilled in the art who understand contents of the invention by using their basic programming skills and hardware design capabilities, and will not be described in detail here.

Furthermore, obviously when the above description involves probable external operations, it is undoubted that any display apparatus and any input apparatus connected to any computing apparatus, and their corresponding interface and control program are to be used. In summary, the related hardware, software and the hardware, firmware, software and combinations thereof to implement operations in the above-described method, of the computer, computer system and computer network constitute apparatus and its component parts of the invention.

Thus, based on the above understanding, objects of the invention may be implemented by running a program or a set of programs on any information processing apparatus. The information processing apparatus may be well-known general apparatus. Thus, objects of the invention may also be implemented by providing only a program product containing program codes for implementing the method and apparatus. That is, such a program product constitutes the invention, and the storage medium that stores such program product constitutes the invention, too. Obviously, the storage medium may be known to those skilled in the art or any kind of storage medium that will be developed in the future and thus will not be enumerated here.

In the apparatus and method of the invention, obviously respective parts and steps may be decompounded and/or re-combined. Such decompounding and/or re-combining should be considered as equivalent solutions of the invention.

While the invention has been shown and described with reference to certain embodiments thereof, it is to be understood by those skilled in the art that the invention is not limited to the details shown and described here, and changes and variations may be made to these embodiments in form and detail without departing the spirit or scope of the invention which is protected by the following claims and the equivalents thereof.

Especially, it is obvious to those skilled in the art that the invention may be applied not only to the message polling applications, and actually polls of any information system may employ the present method and corresponding apparatus.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A computer implemented method for information polling, the computer implemented method comprising:
a computer processor configured to perform:
(a) receiving at least one information polling request from at least one application executing on at least one application client;
(b) acquiring at least one message requested by the application, and calculating a reference polling cycle of the application in response to receiving the information polling request;
(c) sending the message requested by the application and the reference polling cycle to the application;
wherein calculating the reference polling cycle takes into account each of:
a length of a message queue;
an arrival rate of the message;
a load condition of a server for processing the information polling request;
a preference order of responding to the information polling request of the application client;
an information process capability of the application client; and
a validity term of the message.

2. The method of claim 1, wherein the steps (a) through (c) are repeated in response to a new information polling request of the application.

3. The method of claim 1, wherein the message requested by the application is acquired from a message queue.

4. The method of claim 1, wherein the reference polling cycle is used by the application to reset a poll clock of the application.

5. The method of claim 4, wherein the application sends a next information polling request according to reset the poll clock.

6. The method of claims 1, wherein the application determines a polling cycle of sending a next information poll request according to a load condition of the application client and the reference polling cycle which has been received.

7. The method of claim 6, wherein the polling cycle which has been determined for sending a next information polling request is greater than the reference polling cycle.

8. The method of claim 4, wherein the application immediately sends a polling request for a specific message according to a related emergent request.

9. A computer implemented method for information polling, the computer implemented method comprising:
a computer processor configured to perform:
sending, by an application client on a client device, at least one information polling request to an information processing system, wherein the client device is separate and distinct from the information processing system;
receiving, by the application client, from the at least one information processing system in response to sending the information polling request, a set of information requested by the information polling request and a reference polling cycle, wherein the reference polling cycle indicates to the application client when to send a subsequent information polling request to the information processing system; and
updating, by the application client, a polling cycle used for sending a subsequent information polling request based on the reference polling cycle that has been received and a current load condition of the application client.

10. The computer implemented method of claim 9, further comprising:
identifying a message requested by the application based on the information polling request; and
acquiring the message from a message queue.

11. The computer implemented method of claim 10, wherein calculating the reference polling cycle takes into account each of:
a length of a message queue;
an arrival rate of the message;
a load condition of a server for processing the information polling request;
a preference order of responding to the information polling request of the application client;
an information process capability of the application client; and
a validity term of the message.

12. An information polling system, comprising:
a message gateway, wherein the message gateway receives at least one information polling request sent by at least one application running on at least one application client, and in response to the information polling request which has been received, the message gateway acquires at least one message requested by the application and calculates a reference polling cycle of the application, and sends the message requested by the application and the reference poll cycle to the application in the application client,
wherein the application client updates a polling cycle used for sending a subsequent information polling request based on a current load condition of the application client being one of above and below an average load condition of the application client, and also based on the reference polling cycle that has been received.

13. The system of claim 12, wherein the message gateway acquires the message requested by the application from a message queue.

14. The system of claim 13, wherein calculating the reference poll cycle takes into account each of:
a length of a message queue;
an arrival rate of the message;
a load condition of a server for processing the information polling request;
a preference order of responding to the information polling request of the application client;
an information process capability of the application client; and
a validity term of the message.

15. The system of claims 14, wherein the reference polling cycle is used by the application to reset a poll clock of the application.

16. The system of claim 15, wherein the application sends a next information polling request according to reset the poll clock.

17. The system of claim 14, wherein the application determines a polling cycle of sending a next information polling request according to the load condition of the application client and the reference polling cycle which has been received;
wherein the polling cycle which has been determined for sending the next information polling request is greater than the reference polling cycle; and
wherein the application immediately sends a polling request for a specific message according to a related emergent request.

18. A computer program product for calculating polling in a computer system, the computer program product comprising:
- a non-transitory storage medium readable by the computer system, the computer readable medium storing instructions for performing:
- (a) receiving at least one information polling request from at least one application executing on at least one application client;
- (b) acquiring at least one message requested by the application, and calculating a reference polling cycle of the application in response to receiving the information polling request; and
- (c) sending the message requested by the application and the reference polling cycle to the application,
- wherein the application client updates a polling cycle used for sending a subsequent information polling request based on the reference polling cycle that has been received and a current load condition of the applicant client being one of above and below an average load condition of the application client.

19. The computer program product of claim 18, wherein the instructions (a) through (c) are repeated in response to a new information polling request of the application.

* * * * *